(12) United States Patent
Deivasigamani

(10) Patent No.: US 12,287,755 B2
(45) Date of Patent: Apr. 29, 2025

(54) HARDWARE-BASED SAVE-AND-RESTORE CONTROLLER

(71) Applicant: Google LLC, Mountain View, CA (US)

(72) Inventor: Vinoth Kumar Deivasigamani, San Diego, CA (US)

(73) Assignee: Google LLC, Mountain View, CA (US)

( * ) Notice: Subject to any disclaimer, the term of this patent is extended or adjusted under 35 U.S.C. 154(b) by 123 days.

(21) Appl. No.: 18/043,872

(22) PCT Filed: Sep. 11, 2020

(86) PCT No.: PCT/US2020/050288
§ 371 (c)(1),
(2) Date: Mar. 2, 2023

(87) PCT Pub. No.: WO2022/055490
PCT Pub. Date: Mar. 17, 2022

(65) Prior Publication Data
US 2023/0315588 A1  Oct. 5, 2023

(51) Int. Cl.
*G06F 15/177* (2006.01)
*G06F 1/14* (2006.01)
*G06F 11/14* (2006.01)

(52) U.S. Cl.
CPC ........ *G06F 15/177* (2013.01); *G06F 11/1417* (2013.01); *G06F 11/1441* (2013.01)

(58) Field of Classification Search
CPC .............. G06F 15/177; G06F 11/1458; G06F 11/1417
See application file for complete search history.

(56) References Cited

U.S. PATENT DOCUMENTS

| 8,117,428 B2 | 2/2012 | Breton et al. |
| 9,946,610 B2 | 4/2018 | Kinoshita |
| (Continued) | | |

FOREIGN PATENT DOCUMENTS

| WO | 2022055490 | 3/2022 |

OTHER PUBLICATIONS

Wikipedia, Static random-access memory, retrieved from the internet at <http://web.archive.org/web/20191201034104/https://en.wikipedia.org/wiki/Static_random-access_memory> (Year: 2019).*

(Continued)

*Primary Examiner* — Stefan Stoynov
(74) *Attorney, Agent, or Firm* — Colby Nipper PLLC

(57) ABSTRACT

This document describes systems and techniques for a hardware-based save-and-restore controller in an SoC. The described systems and techniques can automatically save and restore access control configurations (e.g., register states) of IP subsystems during a power-down and a power-up sequence, respectively. The save operation is initiated by a local save-and-restore (L SAR) controller and performed by the IP subsystems writing the configuration values to a central save-and-restore (C-SAR) controller before powering down a power domain. The C-SAR controller saves the configuration information in a memory located in an always-on power domain. The described systems and techniques initiate, via the L SAR controller, a restore operation as part of the power-up sequence. In this way, the described systems and techniques provide scalable save-and-restore services, support a large number of power domains, and allow a variable number of access control configurations to be saved and restored.

20 Claims, 8 Drawing Sheets

(56) References Cited

U.S. PATENT DOCUMENTS

| | | |
|---|---|---|
| 2008/0263396 A1 | 10/2008 | Kimura |
| 2012/0054511 A1 | 3/2012 | Brinks et al. |
| 2015/0316971 A1 | 11/2015 | Tadepalli et al. |
| 2017/0052579 A1* | 2/2017 | Abraham ................ G06F 1/266 |
| 2020/0257627 A1 | 8/2020 | Chamarty et al. |

OTHER PUBLICATIONS

Xilinx, AMBA AXI4 Interface Protocol, retrieved from the internet at <http://web.archive.org/web/20190704145928/https://www.xilinx.com/products/intellectual-property/axi.html#benefits> (Year: 2019).*
"International Preliminary Report on Patentability", Application No. PCT/US2020/050288, Mar. 7, 2023, 13 pages.
"International Search Report and Written Opinion", Application No. PCT/US2020/050288, Jun. 1, 2021, 17 pages.

* cited by examiner

HARDWARE-BASED SAVE-AND-RESTORE CONTROLLER

RELATED APPLICATION(S)

This application is a national stage entry of International Application No. PCT/US2020/050288, filed Sep. 11, 2020, the disclosure of which is incorporated herein by reference in its entirety.

BACKGROUND

Systems-on-chip (SoCs) often include multiple blocks that can be configured by high-privilege security realms. One example of such blocks are intellectual property (IP) blocks, which are referred to as such because they are or contain intellectual property. The IP blocks usually include one or more IP subsystems. The IP blocks can be spread out across the SoC and located within different power domains. The SoC can power down, and subsequently power-up, at least one of the power domains to reduce power consumption. When a power-down operation occurs, the IP subsystems in the affected power domains can lose access control configurations (e.g., register states) and can require secure reconfiguration upon power-up.

IP subsystems (and other subsystems with access control configurations) can retain a subset of their access control configurations to avoid losing configuration values upon power-down and requiring reconfiguration upon power-up. For example, these IP subsystems can use retention registers to maintain selected configuration values. The use of retention registers, however, can be expensive, especially for large SoCs with multiple IP blocks, and inflexible beyond a particular stage in the design process. A cheaper and more flexible solution to retain configuration values across power-down and power-up operations can allow SoCs to reduce power consumption.

SUMMARY

This document describes systems and techniques for a hardware-based save-and-restore controller in an SoC. The described systems and techniques can automatically save and restore access control configurations (e.g., register states) of IP subsystems (and/or other subsystems with access control configurations) during a power-down and a power-up sequence, respectively. The save operation is initiated by a local save-and-restore (L-SAR) controller and performed by the IP subsystems writing the configuration values to a central save-and-restore (C-SAR) controller before powering down a power domain. The C-SAR controller saves the configuration information in a memory located in an always-on power domain. The described systems and techniques can initiate, via the L-SAR controller, a restore operation as part of the power-up sequence. In this way, the described systems and techniques provide scalable save-and-restore services, support a large number of power domains, and allow a variable number of access control configurations to be saved and restored.

For example, an SoC includes multiple IP blocks. The multiple IP blocks include at least one IP subsystem and an L-SAR controller. Each L-SAR controller is operatively coupled to the at least one IP subsystem of the respective IP block. The SoC also includes a C-SAR controller that includes a hardware-based memory. The C-SAR controller is operatively coupled, via an interface, to the L-SAR controllers. In response to a power-down sequence of one or more IP blocks, the respective L-SAR controllers initiate a save operation of access control configurations for the at least one IP subsystem of the respective IP blocks. The save operation includes instructions for the at least one IP subsystem to send the access control configurations over an interface channel. The C-SAR controller receives the access control configurations of the at least one IP subsystem and writes the access control configurations to the hardware-based memory.

This document also describes other methods, configurations, and systems, for a hardware-based save-and-restore controller.

This Summary is provided to introduce simplified concepts for a hardware-based save-and-restore controller in an SoC, which is further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of adaptive frequency control in integrated circuits are described in this document with reference to the following drawings. The same numbers are used throughout multiple drawings to reference like features and components.

DETAILED DESCRIPTION

Overview

Figure 1:
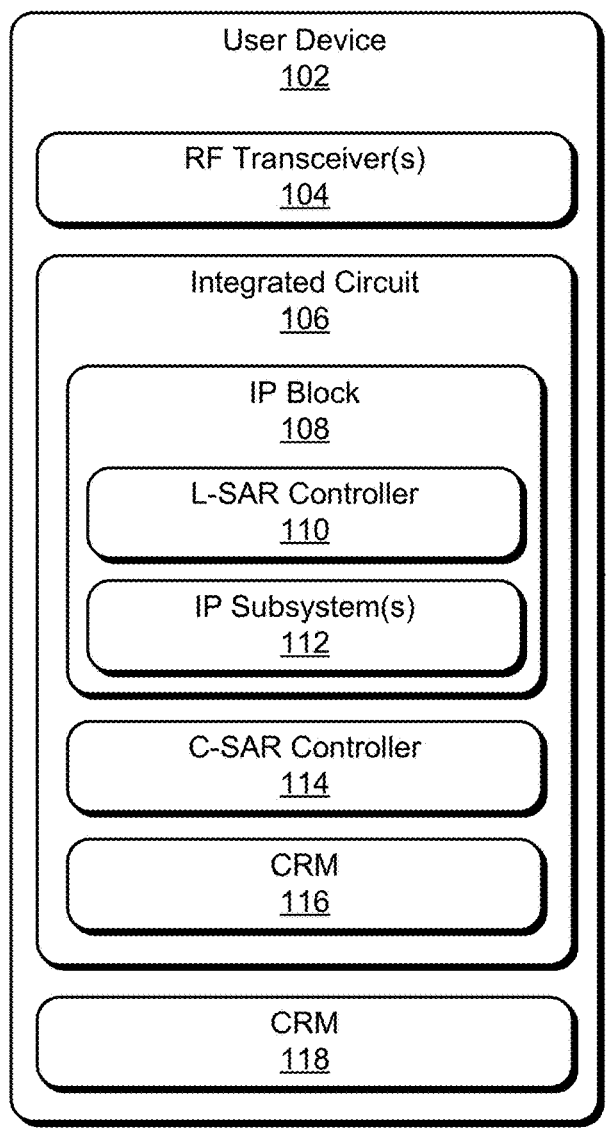
FIG. 1 illustrates an example device diagram of a user device in which a hardware-based SAR controller in an integrated circuit can be implemented.
Figure 1:
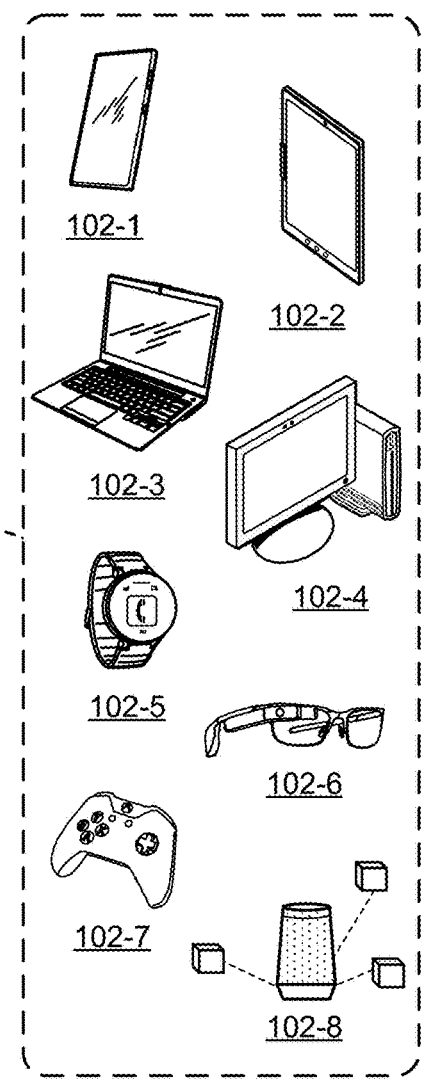

This document describes a hardware-based save-and-restore controller. The IP blocks of an SoC can include at least one IP subsystem with access control configurations. One or more IP subsystems may require retention of a subset of the access control configurations (e.g., register states) across power-down and power-up operations.

For convenience, this document describes embodiments and examples with reference to an SoC that includes IP subsystems but, as noted, the principles of this document may be applied generally to blocks or subsystems having access control configurations and where it is desired to retain at least a subset of the access control configurations upon power-down to avoid losing configuration values.

Some SoCs use a software-based approach to retain access control configurations. Such SoCs utilize a notification mechanism to notify high-privilege IP subsystems when the corresponding power domains are scheduled to be powered down or powered up. The high-privilege IP subsystems can then save and restore their access control configurations. The notification mechanism, however, may require an IP subsystem to be included on a critical path for power-down and power-up operations. The inclusion of IP subsystems increases the latency of power-down and power-up operations, which can limit the opportunity for power savings in an SoC. In addition, the notification mechanism may not address IP subsystems owned by multiple high-privilege security realms, whose security models may not permit them to trust each other.

Other SoCs may use a retention rail to retain access control configurations of high-privilege IP subsystems across a power-down operation. The implementation of a retention rail, however, can be complex and expensive. For example, engineers generally must identify the access control configurations utilizing the retention rail relatively early in the SoC-design process. When IP subsystems store access control configurations in a retention rail, the configurations can be more susceptible to fault injection attacks.

In contrast, the described systems and techniques herein provide a hardware-based save-and-restore controller that is scalable, efficient, and avoids cross-realm trust. The described systems and techniques can automatically save and restore access control configurations (e.g., register states) of IP subsystems during a power-down and a power-up sequence. A save operation is initiated by writing a command word to a control register before a power domain is powered down. A local save-and-restore (L-SAR) controller acts on that command and transfers the configuration information to a central save-and-restore (C-SAR) controller, which in turn stores it in a memory located in an always-on power domain. The described systems and techniques initiate a restore operation as part of the power-up sequence.

As a non-limiting example, an SoC includes multiple IP blocks, which include at least one IP subsystem, and multiple respective L-SAR controllers associated with respective ones of the multiple IP blocks. Each of the multiple L-SAR controllers is operatively coupled to the at least one IP subsystem of the respective IP block. The SoC also includes a C-SAR controller that includes a hardware-based memory and operatively coupled, via an interface, to the respective L-SAR controller of the multiple IP blocks. In response to a power-down sequence of the respective IP block, the L-SAR controller initiates a save operation of access control configurations of the at least one IP subsystem of the respective IP block. The save operation includes instructions for the at least one IP subsystem to send the access control configurations over an interface channel associated with the interface. The C-SAR controller is configured to receive, over the interface channel, the access control configurations of the at least one IP subsystem and write the access control configurations to the hardware-based memory.

In response to a power-up sequence of the respective IP block, the L-SAR controller initiates a restore operation of the access control configurations of the at least one IP subsystem of the respective IP block. The restore operation includes instructions for the at least one IP subsystem to request the access control configurations from the C-SAR controller. The C-SAR controller is configured to transmit, over another interface channel, the access control configurations to the at least one IP subsystem.

In this way, the described systems and techniques provide scalable save-and-restore services, support a large number of power domains, and allow a variable number of access control configurations to be saved and restored. The described save-and-restore controller can distribute operations across different IP blocks without requiring engineers to provide new specifications and requirements to the system-level design. The save-and-restore controller also allows engineers to add or remove access control configurations (e.g., registers) during the SoC design process. As a result, the described save-and-restore controller can partition ownership over IP subsystems or access control configurations thereof to minimize communication among design teams during the development process for an SoC.

The described systems and techniques can also provide efficiencies in the area, power consumption, and performance of an SoC. In particular, the described save-and-restore controller can reduce the latency of power-down and power-up operations.

In addition, the described save-and-restore controller avoids requiring a security realm, related to one or more IP blocks, to trust another security realm. As an example, the described SAR controller can avoid requiring TrustZone to trust other IP owners or realms to save and restore TrustZone-specific access control configuration.

This example is just one illustration of how the described hardware-based save-and-restore controller can improve scalability, efficiency, and trust in SoCs. Other example configurations and methods are described throughout this document. This document now describes additional example configurations, components, and methods of the described hardware-based save-and-restore controller.

Example Devices

FIG. 1 illustrates an example device diagram 100 of a user device 102 in which a hardware-based save-and-restore controller in an integrated circuit 106 can be implemented. The user device 102 may include additional components and interfaces omitted from FIG. 1 for the sake of clarity.

The user device 102 can be a variety of consumer electronic devices. As non-limiting examples, the user device 102 can be a mobile phone 102-1, a tablet device 102-2, a laptop computer 102-3, a desktop computer 102-4, a computerized watch 102-5, a wearable computer 102-6, a video game controller 102-7, or a voice-assistant system 102-8.

The user device 102 includes one or more radio frequency (RF) transceivers 104 for communicating over wireless networks. The user device 102 can tune the RF transceivers 104 and supporting circuitry (e.g., antennas, front-end modules, amplifiers) to one or more frequency bands defined by various communication standards.

The user device 102 also includes the integrated circuit 106. The integrated circuit 106 can include, as non-limiting examples, an SoC, a central processing unit, a graphics processing unit, or a tensor processing unit. An SoC generally integrates many of the components of the user device 102 into a single device, including a central processing unit, a memory, and input and output ports. A central processing unit generally executes commands and processes needed for the user device 102. A graphics processing unit performs operations to display graphics of the user device 102 and can perform other specific computational tasks. The tensor processing unit generally performs symbolic match operations in neural-network machine-learning applications. The integrated circuit 106 can include a single core or multiple cores.

In addition, the user device 102 includes computer-readable storage media (CRM) 118. The CRM 118 is a suitable storage device (e.g., random-access memory (RAM), static RAM (SRAM), dynamic RAM (DRAM), non-volatile RAM (NVRAM), read-only memory (ROM), Flash memory) to store device data of the user device 102. The device data can include an operating system, one or more applications, user data, and multimedia data. In other implementations, the CRM 116 can store the operating system and a subset of the applications, user data, and multimedia data of the integrated circuit 106. Similar to the CRM 118, the CRM 116 is a suitable storage device to store device data of the user device 102.

The operating system generally manages hardware and software resources of the user device 102 and provides common services for the applications. The operating system and the applications are generally executable by the integrated circuit 106 (e.g., an SoC, a central processing unit) to enable communications and user interaction with the user device 102.

The integrated circuit 106 also includes one or more IP blocks 108 and a C-SAR controller 114. The integrated circuit 106 can include other components, including communication units (e.g., modems), input/output controllers, and system interfaces.

Each IP block 108 includes an L-SAR controller 110 and one or more IP subsystems 112. The IP blocks 108 can represent a collection of IP subsystems within a particular power domain of the integrated circuit 106. The L-SAR controller 110 of an IP block 108 provides a single point of command and control for software to interface with save-and-restore mechanisms for the IP subsystems 112 within the corresponding IP block 108. The L-SAR controller 110 provides a save-and-restore interface that is agnostic to the IP blocks 108 and the IP subsystems 112. The L-SAR controller 110 can include hardware, firmware, software, or a combination thereof. The IP subsystems 112 include values of access control configurations (e.g., register state information) that are saved and restored across a power-cycle event for the corresponding IP block 108 and/or power domain.

The L-SAR controllers 110 are operably connected to the one or more IP subsystems 112 within the respective IP blocks 108. The L-SAR controller 110 of an IP block 108 can instruct the IP subsystems 112 of the IP block 108 to stream configuration values to the C-SAR controller 114 before a power-down operation. In response to a power-up operation, the L-SAR controller 110 of the IP block 108 can initiate instructions to the IP subsystems 112 to retrieve the configuration values from the C-SAR controller 114 and restore them into registers of the IP subsystems 112 of the IP block 108.

The C-SAR controller 114 is located in an always-on power domain of the integrated circuit 106. The C-SAR controller 114 can include hardware, firmware, software, or a combination thereof. The C-SAR controller 114 is operably connected to the IP subsystems 112. The C-SAR controller 114 can store the configuration values of the IP subsystems 112 while the corresponding power domains are not powered. In this manner, the interface to multiple IP subsystems 112 across potentially multiple IP blocks 108 and/or multiple power domains can be aggregated into a single C-SAR controller 114. This document describes the components and operations of the hardware-based save-and-restore controller in greater detail with respect to FIG. 2.

Figure 2:
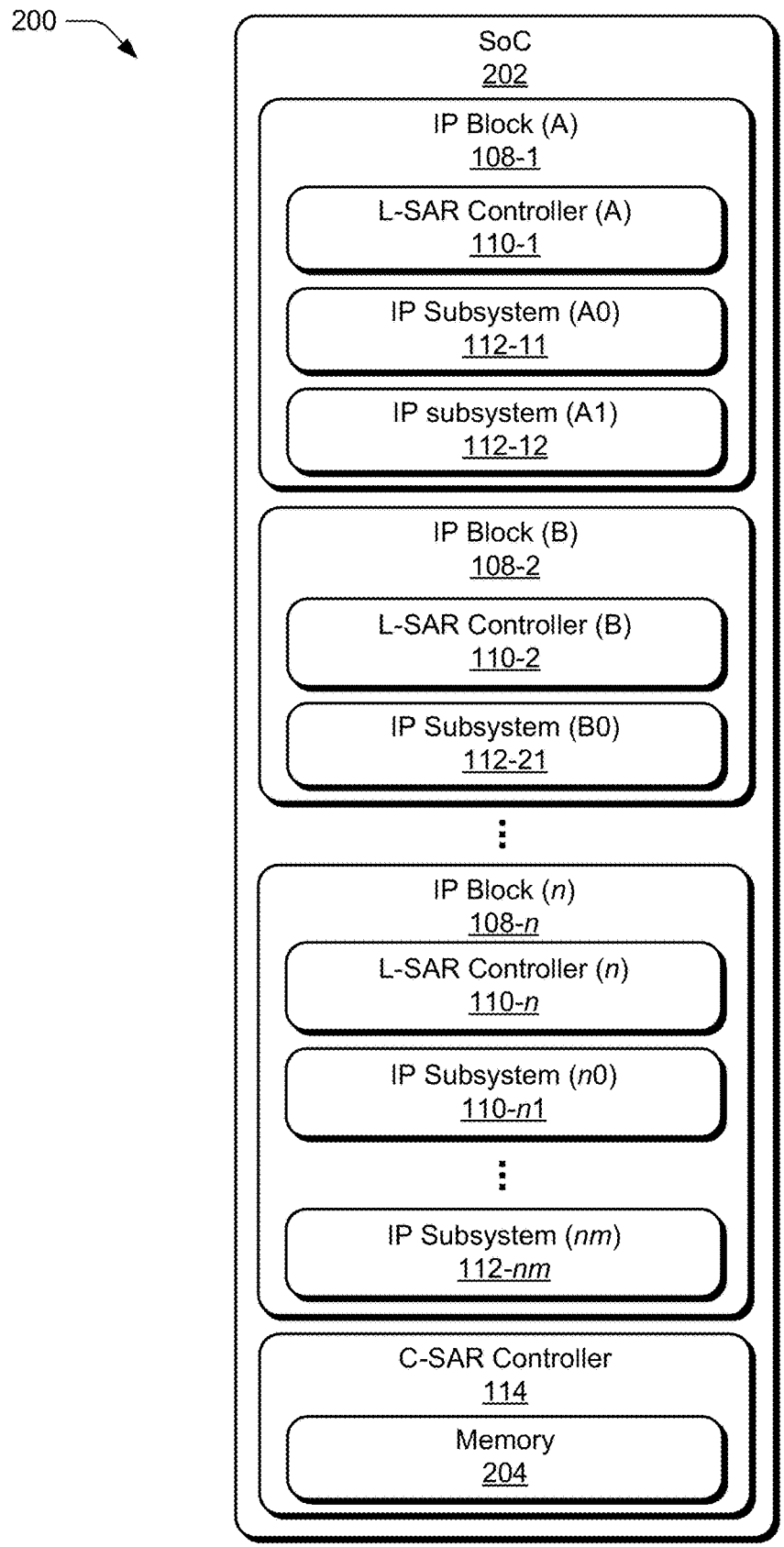
FIG. 2 illustrates an example device diagram of an SoC in which a hardware-based save-and-restore controller can be implemented.

FIG. 2 illustrates an example device diagram 200 of an SoC 202 in which a hardware-based SAR controller can be implemented. In this example, the SoC 202 includes similar components to those shown in the integrated circuit 106 of FIG. 1, with some additional detail. The SoC 202 can include additional components, which are not illustrated in FIG. 2.

The SoC 202 includes multiple IP blocks 108 and the C-SAR controller 114. The IP blocks 108 include an IP block (A) 108-1, an IP block (B) 108-2, and one or more additional IP blocks, including an IP block (n) 108-n, where n represents a positive integer. Each of the IP blocks 108 includes an L-SAR controller 110 and one or more IP subsystems 112. In this example, the IP block (A) 108-1 includes an L-SAR controller (A) 110-1 operably connected to an IP subsystem (A0) 112-11 and an IP subsystem (A1) 112-12. The IP block (B) 108-2 includes an L-SAR controller (B) 110-2 operably connected to an IP subsystem (B0) 112-21. The IP block (n) 108-n includes an L-SAR controller (n) 110-n operably connected to an IP subsystem (n0) 112-n1 and an IP subsystem (nm) 112-nm, where m represents a positive integer.

The C-SAR controller 114 includes a memory 204. The memory 204 is a suitable storage device (e.g., RAM, SRAM, DRAM, NVRAM, and Flash memory) to store configuration values of the IP subsystems 112. The memory 204 is always on and sufficiently large to store configuration values from the IP subsystems 112 of the SoC 202. For example, the memory 204 can be an SRAM with 16 kilobytes (KB) of storage space. The C-SAR controller 114 can write the configuration values received from the IP subsystems 112 into the memory 204 as part of a power-down operation. In response to a request from the IP subsystems 112, the C-SAR controller 114 can send the configuration values to the IP subsystems 112. The C-SAR controller 114 can also retrieve the configuration values from the memory 204 to push to the IP subsystems 112 as part of a power-up operation.

Figure 3:
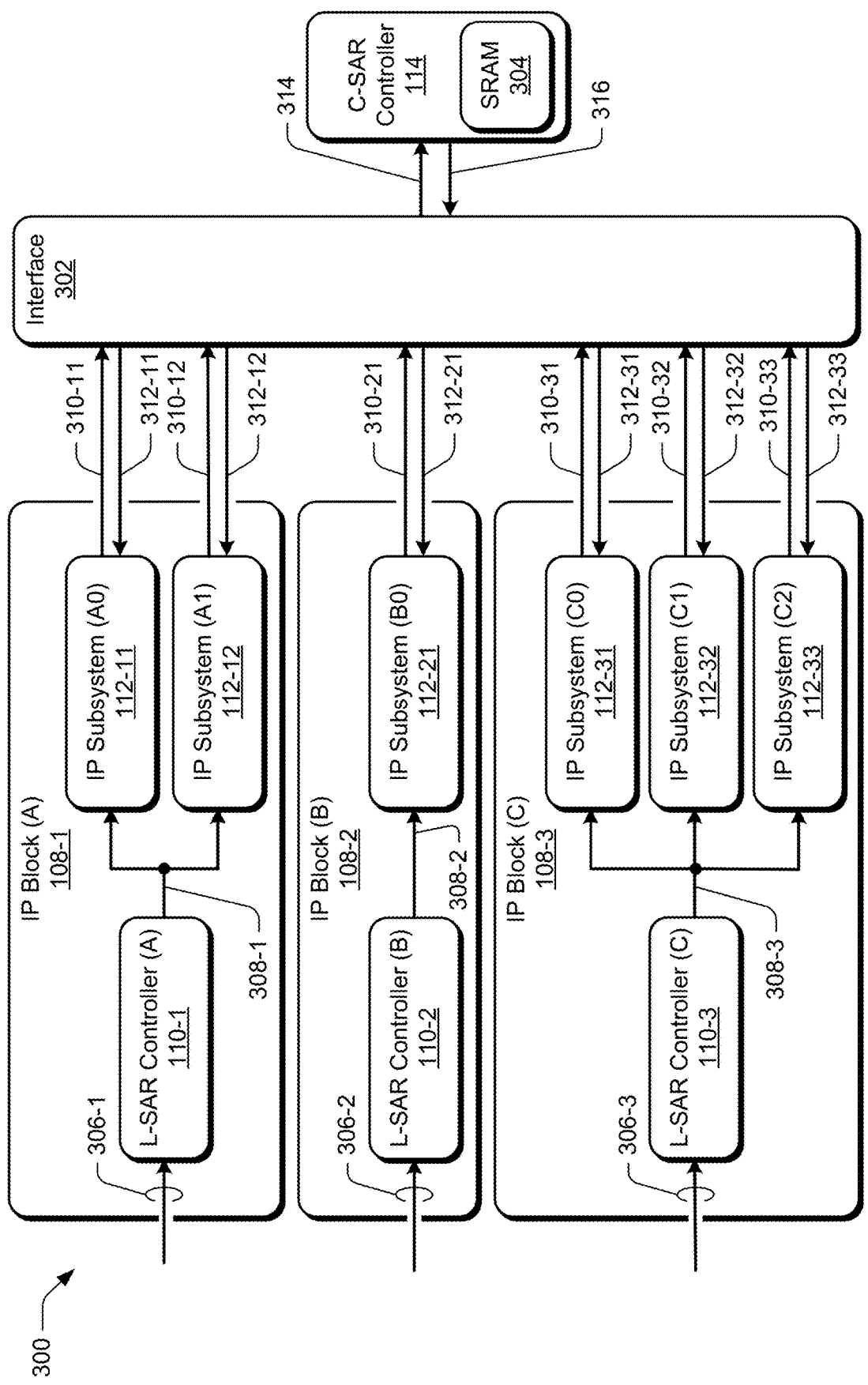
FIG. 3 illustrates an example diagram of a hardware-based save-and-restore controller of an SoC.

This document describes the operation of the hardware-based save-and-restore controller, specifically the operations of the L-SAR controllers 110, the IP subsystems 112, and the C-SAR controller 114, in greater detail with respect to FIG. 3. This document also describes the operation and configuration of the memory 204 in greater detail with respect to FIG. 6.

Example Configurations

This section illustrates example configurations of a hardware-based save-and-restore controller, which may occur separately or together in whole or in part. This section describes various example configurations, each described in relation to a drawing for ease of reading.

FIG. 3 illustrates an example diagram 300 of a hardware-based save-and-restore controller of the SoC 202. The hardware-based save-and-restore controller includes the IP blocks 108 and the C-SAR controller 114. The C-SAR controller 114 can save and restore values of access control configurations of the one or more IP subsystems 112 included within the IP blocks 108. In other implementations, the SoC 202 can include multiple C-SAR controllers 114, wherein each of the C-SAR controllers 114 can manage a save-and-restore domain of the SoC 202. In such implementations, one or more of the multiple C-SAR controllers 114 can be nested within other C-SAR controller 114. In this implementation, the configuration of the one or more nested C-SAR controllers 114 can be saved to an outer C-SAR controller 114, allowing the nested C-SAR controllers 114 to fully power collapse.

In the diagram 300, the hardware-based save-and-restore controller includes the IP block (A) 108-1, the IP block (B) 108-2, and the IP block (C) 108-3. The IP block (A) 108-1 includes an L-SAR controller (A) 110-1 operably connected, via a connection 308-1, to the IP subsystem (A0) 112-11, the IP subsystem (A1) 112-12, or a combination thereof.

The IP block (B) 108-2 includes the L-SAR controller (B) 110-2 operably connected, via a connection 308-2, to the IP subsystem (B0) 112-21. The IP block (C) 108-3 includes the L-SAR controller (C) 110-3 operably connected, via a connection 308-3, to the IP subsystem (C0) 112-31, the IP subsystem (C1) 112-32, the IP subsystem (C2) 112-33, or any combination thereof.

The L-SAR controllers 110 within the respective IP blocks 108 control the IP subsystems 112 within the respective IP block 108. The L-SAR controller 110 is connected to each of the IP subsystems 112 therein that request save-and-restore services. The IP subsystems 112 are connected to the C-SAR controller 114 through two ports (e.g., one for save operations and one for restore operations) of an interface 302 (e.g., an AXI4-Stream interface). The described save-and-restore controller is scalable by minimizing coordination between owners of multiple control access components. For example, the respective IP block 108 owns the respective L-SAR controller 110 and the IP subsystems 112. A power controller can own the interface 302 and the C-SAR controller 114.

The C-SAR controller 114 is located within an always-on power domain of the SoC 202 and includes an SRAM 304. The C-SAR controller 114 is operatively coupled, via the interface 302, to the IP subsystems 112 of the IP blocks 108. The IP subsystems 112 can stream access control configurations in and out of the C-SAR controller 114 through the interface 302 using dedicated input connections 310 and dedicated output connections 312, respectively. The interface 302 relays the inputs to the C-SAR controller 114 over an input connection 314 and receives outputs from the C-SAR controller 114 over an output connection 316. In this manner, the SoC can efficiently aggregate the access control configurations of multiple IP subsystems 112 from different IP blocks 108 into the single C-SAR controller 114. In some implementations, the interface 302 can be an advanced extensible interface 4 (AXI4) stream interface.

In the diagram 300, the IP subsystem (A0) 112-11 has a dedicated input connection 310-11 and a dedicated output connection 312-11 to the interface 302. The IP subsystem (A1) 112-12 has a dedicated input connection 310-12 and a dedicated output connection 312-12 to the interface 302. The IP subsystem (B0) 112-21 has a dedicated input connection 310-21 and a dedicated output connection 312-21 to the interface 302. The IP subsystem (C0) 112-31 has a dedicated input connection 310-31 and a dedicated output connection 312-31 to the interface 302. The IP subsystem (C1) 112-32 has a dedicated input connection 310-32 and a dedicated output connection 312-32 to the interface 302. Similarly, the IP subsystem (C2) 112-33 has a dedicated input connection 310-33 and a dedicated output connection 312-33 to the interface 302.

During a power-down sequence for one or more of the IP blocks 108, software in the SoC 202 triggers the L-SAR controller 110 of the one or more IP blocks 108 to initiate instructions to the respective IP subsystems 112 to stream values of the access control configurations out to the C-SAR controller 114. For example, the SoC 202 can enter the IP block (C) 108-3 into a power-down sequence. In response to the power-down sequence, software triggers the L-SAR controller (C) 110-3 to transmit instructions to the IP subsystem (C0) 112-31, the IP subsystem (C1) 112-32, and the IP subsystem (C2) 112-33 via the connection 308-3. The L-SAR controller (C) 110-3 can also receive status updates from the IP subsystem (C0) 112-31, the IP subsystem (C1) 112-32, and the IP subsystem (C2) 112-33 via the connection 308-3. The IP subsystem (C0) 112-31, the IP subsystem (C1) 112-32, and the IP subsystem (C2) 112-33 can send a write request to the C-SAR controller 114 via the interface 302 to save access control configurations. The IP subsystems 112 select the access control configurations to save to the C-SAR controller 114. The IP subsystems 112 can process the state of the access control configurations, which can include IP-specific processing (e.g., encryption, decryption, authentication, verification). The IP subsystems 112 can also pack and unpack the data in requests to or responses from the C-SAR controller 114. As an example, the IP subsystem (C0) 112-31 can send a write request over the dedicated input connection 310-31 to the interface 302, which then sends the write request (WREQ) to the C-SAR controller 114 over the input connection 314. In response, the C-SAR controller 114 can send a write response (WRESP) to the IP subsystem (C0) 112-31 to provide a status update of the write request. The software of the SoC 202 can check the status of the streaming operation from the IP subsystems 112 to the C-SAR controller 114 before continuing with the power-down sequence.

During a power-up sequence for one or more IP blocks 108, the L-SAR controller 110 can initiate instructions to the respective IP subsystems 112 to request configuration values from the C-SAR controller 114. The IP subsystems can then restore the configuration values into respective registers. For example, the SoC 202 can enter the IP block (C) 108-3 into a power-up sequence. In response to the power-up sequence, the L-SAR controller (C) 110-3 automatically transmits instructions to the IP subsystem (C0) 112-31, the IP subsystem (C1) 112-32, and the IP subsystem (C2) 112-33 to restore the configuration values from the C-SAR controller 114. The IP subsystem (C0) 112-31, the IP subsystem (C1) 112-32, and the IP subsystem (C2) 112-33 can then send a restore request (RREQ) to the C-SAR controller 114 via the interface 302 to retrieve access control configurations in the SRAM 304. In response, the C-SAR controller 114 can use a restore response (RRESP) to restore the configuration values to the IP subsystem (C0) 112-31.

Figure 4:
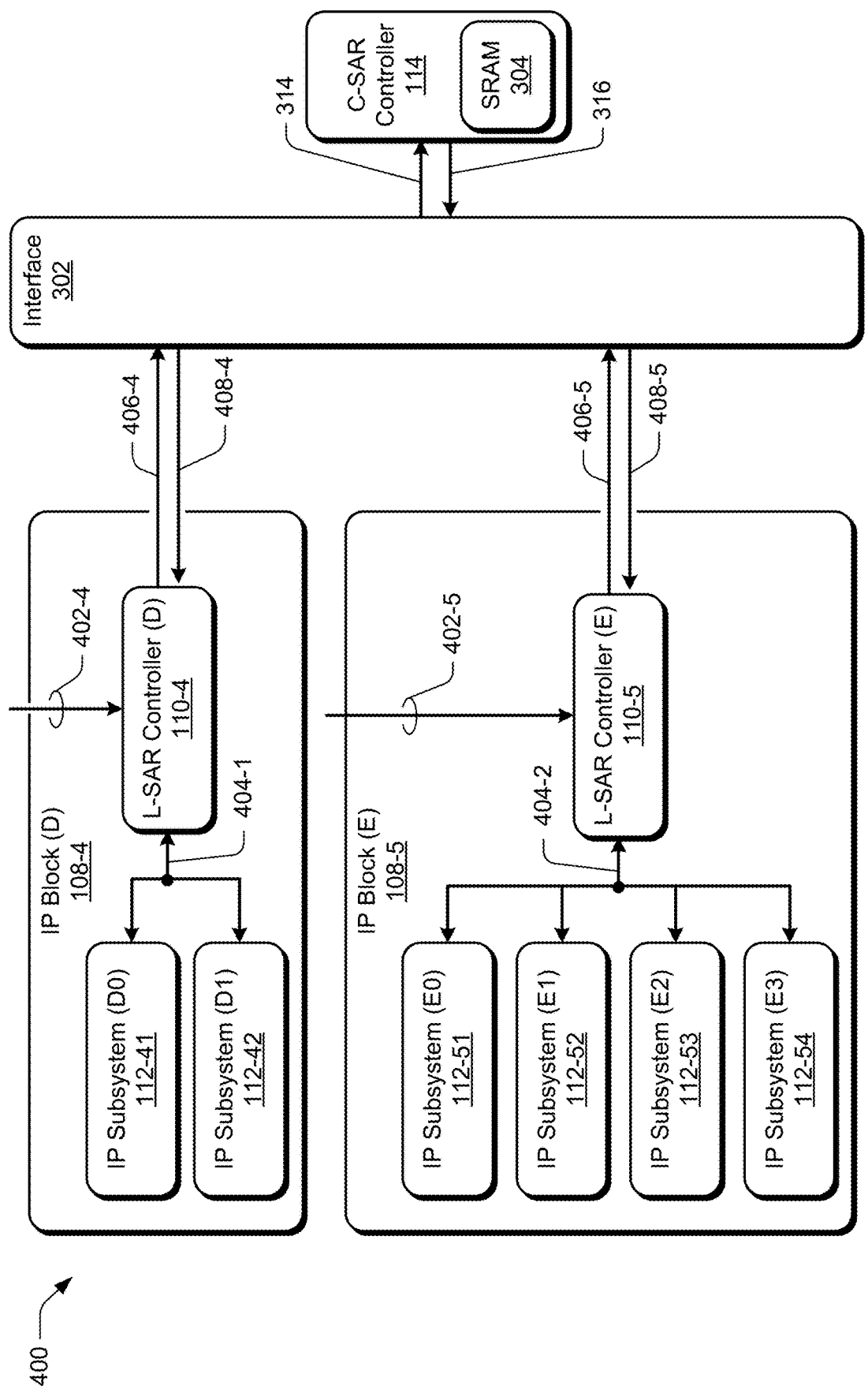
FIG. 4 illustrates another example diagram of a hardware-based save-and-restore controller of an SoC.

FIG. 4 illustrates another example diagram 400 of a hardware-based save-and-restore controller of the SoC 202. In this example, the SoC 202 includes similar components to those shown in the SoC 202 in FIG. 1, with a different arrangement of components. In other implementations, the SoC 202 can have any combination of the components and configurations illustrated in FIGS. 3 and 4.

In the diagram 400, the hardware-based save-and-restore controller includes an IP block (D) 108-4 and an IP block (E) 108-5. The IP block (D) 108-4 includes an L-SAR controller (D) 110-4 operably connected, via a connection 404-1, to an IP subsystem (D0) 112-41 and an IP subsystem (D1) 112-42. The IP block (E) 108-5 includes an L-SAR controller (E) 110-5 operably connected, via a connection 404-2 to an IP subsystem (E0) 112-51, an IP subsystem (E1) 112-52, an IP subsystem (E2) 112-53, and an IP subsystem (E3) 112-54.

The L-SAR controllers 110 within each IP block 108 control the IP subsystems 112 within the respective IP block 108. The L-SAR controller 110 within a respective IP block 108 is connected to each of the IP subsystems 112 therein that require save-and-restore services. The IP subsystems 112 are connected to the C-SAR controller 114, via the respective L-SAR controller 110, through two ports (e.g., one for save operations and one for restore operations) of a stream interface (e.g., an AXI4-Stream interface). The scalability of the described hardware-based save-and-restore controller is ensured by minimizing coordination between owners of multiple control access components. For example, the respective IP blocks 108 own the respective L-SAR controllers 110 and the respective IP subsystems 112. The power team owns the interface 302 and the C-SAR controller 114.

As described with respect to FIG. 3, the C-SAR controller 114 can be located within an always-on power domain and includes SRAM 304. The C-SAR controller 114 is operatively coupled, via an interface 302, to the L-SAR controllers 110 of the IP blocks 108. The IP subsystems 112 can stream, via the L-SAR controllers 110, access control configurations in and out of the C-SAR controller 114 through the interface 302 using dedicated input connections 406 and dedicated output connections 408, respectively. The interface 302 relays the inputs to the C-SAR controller 114 over the input connection 314 and receives outputs from the C-SAR controller 114 over the output connection 316. In this manner, the described hardware save-and-restore controller can efficiently aggregate the access control configurations of multiple IP subsystems 112 into the single C-SAR controller 114.

In the diagram 400, the L-SAR controller (D) 110-4 has a dedicated input connection 406-4 and a dedicated output connection 408-4 to the interface 302. Similarly, the L-SAR controller (E) 110-5 has a dedicated input connection 406-5 and a dedicated output connection 408-5 to the interface 302.

During a power-down sequence for the IP blocks 108, software in the SoC 202 triggers the L-SAR controllers 110 to initiate instructions to the respective IP subsystems 112 to stream, via the respective L-SAR controller 110, values of the access control configurations to the C-SAR controller 114. For example, the SoC 202 can enter the IP block (D) 108-4 into a power-down sequence. In response to the power-down sequence, software triggers the L-SAR controller (D) 110-4 to transmit, via the connection 404-1, commands to the IP subsystem (D0) 112-41 and the IP subsystem (D1) 112-42. The IP subsystem (D0) 112-41 and the IP subsystem (D1) 112-42 can then send, via the L-SAR controller (D) 110-4 and the interface 302, a write request to the C-SAR controller 114 to save access control configurations in the SRAM 304.

As an example, software in the SoC 202 can follow the following sequence to trigger a save operation from a respective L-SAR controller 110. The software can write '1' to a LSARC_COMBINED_STATUS:SAVE_OP_COMBINED_COMPLETE register, which clears the status of any previous save operations. The software can then write '1' to a LSARC_CTL:SAVE_OP_TRIGGER register. The software can poll the LSARC_COMBINED_STATUS:SAVE_OP_COMBINED_COMPLETE register until the register reads '1'. If a LSAR_COMBINED_STATUS:SAVE_OP_COMBINED_STATUS register reads 'OKAY', the save operation has completed successfully. If this register does not read 'OKAY', the save operation failed and the software can take corrective action. Information for example registers is provided in Table 1 and Table 2 below. Table 1 provides field information for the LSARC_CTL register. Table 2 provides field information for the LSARC_COMBINED_STATUS registers, which can combine status information for the IP subsystems 112 associated with a respective L-SAR controller 110.

TABLE 1

| Field name | Bits | Reset value | Description |
| --- | --- | --- | --- |
| SAVE_OP_TRIGGER | 0 | 0x0 | Writing a '1' to this register initiates a save operation on the IP subsystems 112 connected to this L-SAR controller 110 |

TABLE 2

| Field name | Bits | Reset value | Description |
| --- | --- | --- | --- |
| SAVE_OP_COMBINED_STATUS | 5:4 | 0x0 | Consolidated status of save operations in the IP subsystems 112 connected to this L-SAR controller 110<br>0x0: OKAY<br>0x1: ERROR<br>OTHERS: RESERVED |
| SAVE_OP_COMBINED_COMPLETE | 3 | 0x0 | '1' indicates that the save operations in the IP subsystems 112 connected to this L-SAR controller 110 are complete. Software can write '1' to clear this bit and generally clears this bit before writing to LSARC_CTL:SAVE_OP_TRIGGER |
| RESTORE_OP_COMBINED_STATUS | 2:1 | 0x0 | Consolidated status of restore operations in the IP subsystems 112 connected to this L-SAR controller 110<br>0x0: OKAY<br>0x1: ERROR<br>OTHERS: RESERVED |
| RESTORE_OP_COMBINED_COMPLETE | 0 | 0x0 | '1' indicates that the restore operations in the IP subsystems 112 connected to this L-SAR controller 110 are complete. |

The L-SAR controller 110 can also include registers for IP-subsystem-level status registers. The registers can be duplicated for each IP subsystem 112 connected to the respective L-SAR controller 110. During normal operation, software in the SoC 202 generally does not read these registers. These registers are generally used for debug purposes. Table 3 provides field information for the LSARC_IP<n>_STATUS registers, where n is a positive integer associated with each of the IP subsystems 112 connected to the respective L-SAR controller 110.

TABLE 3

| Field name | Bits | Reset value | Description |
| --- | --- | --- | --- |
| SAVE_OP_IP_STATUS | 5:4 | 0x0 | Status of save operation in this IP subsystem 112:<br>0x0: OKAY<br>0x1: ERROR<br>OTHERS: RESERVED |
| SAVE_OP_COMBINED_COMPLETE | 3 | 0x0 | '1' indicates that the save operation in this IP subsystem 112 is complete.<br>This bit can be cleared by writing '1' to LSARC_COMBINED_STATUS:SAVE_OP_COMBINED_COMPLETE |
| RESTORE_OP_COMBINED_STATUS | 2:1 | 0x0 | Status of restore operations in this IP subsystem 112:<br>0x0: OKAY<br>0x1: ERROR<br>OTHERS: RESERVED |
| RESTORE_OP_COMBINED_COMPLETE | 0 | 0x0 | '1' indicates that the restore operation in this IP subsystem 112 is complete.<br>This bit can be cleared by writing '1' to LSARC_COMBINED_STATUS:RESTORE_OP_COMBINED_COMPLETE |

During a power-up sequence for the IP blocks 108, the L-SAR controllers 110 can automatically initiate instructions to the respective IP subsystems 112 to restore the configuration values from the C-SAR controller 114, via the L-SAR controller 110, into respective registers of the access control configurations. Alternatively, the L-SAR controllers 110 can initiate the restore instructions to the respective IP subsystems 112 in response to a trigger from software in the SoC 202. For example, the SoC 202 can enter the IP block (D) 108-4 into a power-up sequence. In response to the power-up sequence, the L-SAR controller (D) 110-4 automatically transmits commands to the IP subsystem (D0) 112-41 and the IP subsystem (D1) 112-42 to restore the configuration values from the C-SAR controller 114. The IP subsystem (D0) 112-41 and the IP subsystem (D1) 112-42 can then send a restore request (e.g., RREQ) to the C-SAR controller 114 via the L-SAR controller (D) 110-4 and the interface 302 to retrieve access control configurations in the SRAM 304. In response, the C-SAR controller 114 can use a restore response (e.g., RRESP) to restore the configuration values to the IP subsystem (D0) 112-41 and the IP subsystem (D1) 112-42.

As an example, software in the SoC 202 can follow the following sequence to check the status of restore operations for a respective L-SAR controller 110. The software can poll the LSARC_COMBINED_STATUS:RESTORE_OP_COMBINED_COMPLETE register until it reads '1'. The software can also check if the LSAR_COMBINED_STATUS:RESTORE_OP_COMBINED_STATUS register reads 'OKAY'. If it does, the restore operation has completed successfully. If this register does not read 'OKAY', the restore operation failed and the software can take corrective action.

Example interface signals between a L-SAR controller 110 and the respective IP subsystems 112 are provided in Table 4 below.

TABLE 4

| Signal name | Direction | Description |
| --- | --- | --- |
| lsarc_save_op_trigger_req | L-SAR controller 110 to IP subsystem(s) 112 | Req signal that is part of the handshake interface to initiate save operation. Rising edge detected by the IP subsystem 112 indicates save operation is requested. May be set to '1' only when lsarc_save_op_trigger_ack is sampled '0'. Once set to '1': it stays '1' until rising edge is detected in lsarc_save_op_trigger_ack; and it is set to '0' once the rising edge is detected in lsarc_save_op_trigger_ack |
| lsarc_save_op_trigger_ack | IP subsystem(s) 112 to L-SAR controller 110 | Ack signal that is part of the handshake interface that communicates that the save operation is complete. Rising edge indicates that the IP subsystem 112 has completed the save operation. May be set to '1' only when lsarc_save_op_trigger_req is sampled '1' and lsarc_save_op_status is updated for the current save request. Once set to '1', it stays '1' until falling edge is detected in lsarc_save_op_trigger_req; it can be set to '0' once the falling edge is detected in lsarc_save_op_trigger_ack |
| lsarc_save_op_status[1:0] | IP subsystem(s) 112 to L-SAR controller 110 | Status of the save operation.<br>0x0: OKAY<br>0x1: ERROR<br>OTHERS: RESERVED |

TABLE 4-continued

| Signal name | Direction | Description |
| --- | --- | --- |
| lsarc_restore_op_complete | IP subsystem(s) 112 to L-SAR controller 110 | '1' indicates that the restoration operation completed. May be set to '1' only when the lsarc_restore_op_status is updated for the completed restoration operation. Power on reset value is 0x0. |
| lsarc_restore_op_status[1:0] | IP subsystem(s) 112 to L-SAR controller 110 | Status of the restoration operation. 0x0: OKAY 0x1: ERROR OTHERS: RESERVED |

Figure 5:
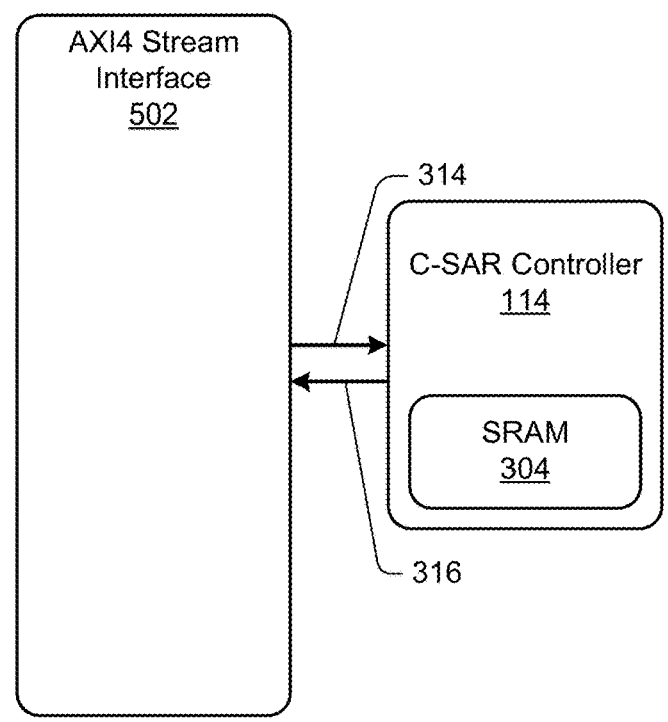
FIG. 5 illustrates an example diagram of an interface and C-SAR controller of a hardware-based save-and-restore controller.

FIG. 5 illustrates an example diagram 500 of an AXI4 stream interface 502 and a C-SAR controller 114 of a hardware-based save-and-restore controller. In this example, the C-SAR controller 114 includes similar components and connections to those shown for the C-SAR controller 114 in FIG. 3, with some additional detail.

In the depicted implementation, the interface 302 of FIG. 3 is the AXI4 stream interface 502. The AXI4 stream interface 502 connects to the C-SAR controller 114 over the input connection 314 and the output connection 316. Communications that flow over the input connection 314 and the output connection 316 of the AXI4 stream interface 502 can have a data bus width of 32 bits and support inter-packet interleaving. The communications generally do not have position-byte support (e.g., TSTRB=all ones) or null-byte support (e.g., TKEEP=all ones).

Communications originating from and destined for the same IP subsystem 112 generally have the same transaction identification (TID) and destination identification (DESTID), respectively. In this way, the C-SAR controller 114 can use the TID from a restore request (RREQ) as the DESTID on the corresponding restore response (RRESP). The TID and DESTID for primary and secondary ports are generally the same as the client identification (CID) for the respective IP subsystem 112 to which those ports belong. The AXI4 stream interface 502 generally assigns the TID, DESTID, and CID to the respective IP subsystem 112.

The CIDs for the IP subsystems 112 connected to the C-SAR controller 114 are generally consecutive. The consecutive CIDs allows a slot-mapping table in the SRAM 304 of the C-SAR controller 114 to be memory-efficient. The AXI4 stream interface 502 generally does not communicate a particular CID to the respective IP subsystem 112. The CID for each IP subsystem 112 connected to the C-SAR controller 114 is generally unique.

The AXI4 stream interface 502 can ensure that the output connection 312 of a particular IP subsystem 112 only has access to the input connection 314 of the C-SAR controller 114. The AXI4 stream interface 502 can also ensure that the output connection 316 of the C-SAR controller 114 has access to the input connections 310 of the IP subsystems 112 that have output connections 312 to the C-SAR controller 114.

The AXI4 stream interface 502 can store any required access control configurations in an always-on power domain or can save and restore them from the C-SAR controller 114 as part of an initialization process for the AXI4 stream interface 502.

The C-SAR controller 114 can receive data from the connected IP subsystems 112 on demand, save the data in the always-on SRAM 304, and send the data back to the connected IP subsystems 112 on demand. As described above, the C-SAR controller 114 is in an always-on power domain and is not power-collapsed.

Communications between the C-SAR controller 114 and the IP subsystems 112 via the AXI4 stream interface 502 are generally packet-based. For example, the C-SAR controller 114 can receive data packets from the IP subsystems 112 through a port of the AXI4 stream interface 502 called packet_in. Similarly, the C-SAR controller 114 can send data packets to the IP subsystems 112 through a port of the AXI4 stream interface 502 called packet_out. The data packets are transported to and from the C-SAR controller 114 as AXI4 stream packets.

The C-SAR controller 114 can support several different data packets, including a WREQ, WRESP, RREQ, and RRESP. The IP subsystems 112 can use the WREQ packet to send data to be saved by the C-SAR controller 114. The C-SAR controller 114 is generally not able to generate a WREQ packet. WREQ packets generated by a particular IP subsystem 112 generally have the same length, which allows the C-SAR controller 114 to allocate a statically-sized memory slot in the SRAM 304 to store the access control configurations from that particular IP subsystem 112. If the C-SAR controller 114 receives a WREQ packet from an IP subsystem 112 with a different length than any previous WREQ packet from the same IP subsystem 112, the C-SAR controller 114 can report an error to the IP subsystem 112.

The C-SAR controller 114 can use the WRESP packet to send a status of a WREQ packet back to the respective IP subsystem 112. The IP subsystems 112 are generally not able to generate a WRESP packet. The C-SAR controller 114 generally generates a WRESP packet in response to a WREQ packet from a particular IP subsystem 112.

When the C-SAR controller 114 receives a WREQ packet from an IP subsystem 112, the C-SAR controller can perform several operations. The C-SAR controller 114 can perform a cyclic redundancy check (CRC) of the WREQ packet. If the CRC fails, the C-SAR controller 114 includes an error response in a field of the corresponding WRESP packet. The C-SAR controller 114 can check the slot-mapping table of the SRAM 304 to determine if the IP subsystem 112 already has an allocated slot. If no allocated slot exists for the IP subsystem 112, the C-SAR controller 114 can allocate a new slot for the IP subsystem 112. The C-SAR controller 114 can also verify that the payload length of the WREQ packet is consistent with the payload length of the allocated slot. If the payload-length verification fails, the C-SAR controller 114 can include an error response in a field of the corresponding WRESP packet. If the C-SAR controller 114 detects no errors in the previous operations, the C-SAR controller 114 can write the payload data from the WREQ packet into the respective slot, compute the CRC for the payload data, and write the CRC for the payload data into the slot. The C-SAR controller can then prepare the WRESP and send it to the respective IP subsystem 112.

The IP subsystems 112 can use the RREQ packet to request data to be restored from the C-SAR controller 114. The C-SAR controller 114 generally does not generate an RREQ packet. The IP subsystems 112 generally cannot send an RREQ packet request data that it has not previously saved in the C-SAR controller 114 in a preceding WREQ packet. The C-SAR controller 114 can use the RRESP packet to restore data to the IP subsystems 112. The IP subsystems 112 generally do not generate an RRESP packet. The C-SAR controller 114 generally only generates an RRESP packet in response to an RREQ packet from a particular IP subsystem 112.

When the C-SAR controller 114 receives an RREQ packet from an IP subsystem 112, the C-SAR controller can perform several operations. The C-SAR controller 114 can verify the CRC of the RREQ packet. If the CRC fails, the C-SAR controller 114 includes an error response in a field of the corresponding RRESP packet. The C-SAR controller 114 can check the slot-mapping table of the SRAM 304 to determine if the IP subsystem 112 already has an allocated slot. If no allocated slot exists for the IP subsystem 112, the C-SAR controller 114 includes an error response in a field of the corresponding RRESP packet. The C-SAR controller 114 can also verify the CRC of the data in the allocated slot. If the CRC fails, the C-SAR controller 114 includes an error response in a field of the corresponding RRESP packet. If the C-SAR controller 114 does not detect an error in the previous operations, the C-SAR controller 114 can read the payload data from the slot, generate the RRESP packet, and send the RRESP packet to the respective IP subsystem 112.

Figure 6:
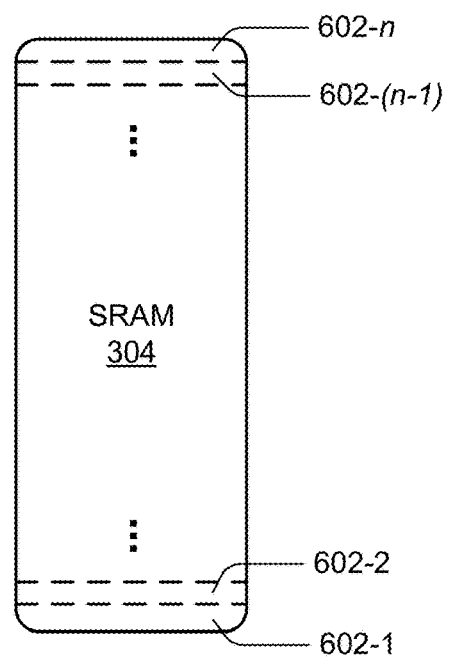
FIG. 6 illustrates an example diagram of a static random-access-memory (SRAM) of a C-SAR controller.

FIG. 6. illustrates an example diagram 600 of the SRAM 304 of the C-SAR controller 114. The SRAM 304 can include additional components, which are not illustrated in FIG. 3.

The SRAM 304 includes slots 602. For example, the slots 602 include a slot 602-1, a slot 602-2, a slot 602-($n$–1), and one or more additional slots, including a slot 602-$n$, where n is a positive integer. The C-SAR controller 114 allocates a static slot 602 in the SRAM 304 for each of the IP subsystems 112 upon receiving a write request (e.g., a WREQ packet). The C-SAR controller 114 determines the location and size of the slot 602 at allocation. For example, the size of the slot 602 is four bytes larger than the size of the payload of the first WREQ packet received from a particular IP subsystem 112. The C-SAR controller 114 can store the CRC of the payload data in the extra four bytes.

The CRC of the payload data is not necessarily the same as the CRC included in the WREQ packet. For example, the CRC in the WREQ packet can cover the entire WREQ packet, including the packet header. In contrast, the CRC stored in the SRAM 304 for each IP subsystem 112 can only cover the payload data from the WREQ packet. The CRC stored in the SRAM 304 can protect against integrity attacks on the SRAM 304. The location and the size of the static slot 602 may persist until the next cold boot of the SoC 202.

The C-SAR controller 114 stores a mapping between an identity of the IP subsystem 112 and the address of the respective slot 602. The slot-mapping table is stored in the SRAM 304 and indexed by the CID of the IP subsystems 112. The location and the length of the slot-mapping table can be programmed by software.

The base address for the slot-mapping table can be allocated at one end (e.g., a top end) of the address space for the SRAM 304. The slot-mapping table grows towards the other end (e.g., a bottom end) of the address space. The base address for the allocated slots can begin at the other end of the address space and grows toward the one end. In this way, the sizing of the SRAM 304 has margins for growth, and growth of the allocated-slot area and/or the slot-mapping table does not necessarily disrupt the management of the SRAM 304.

Example Methods

Figure 7:
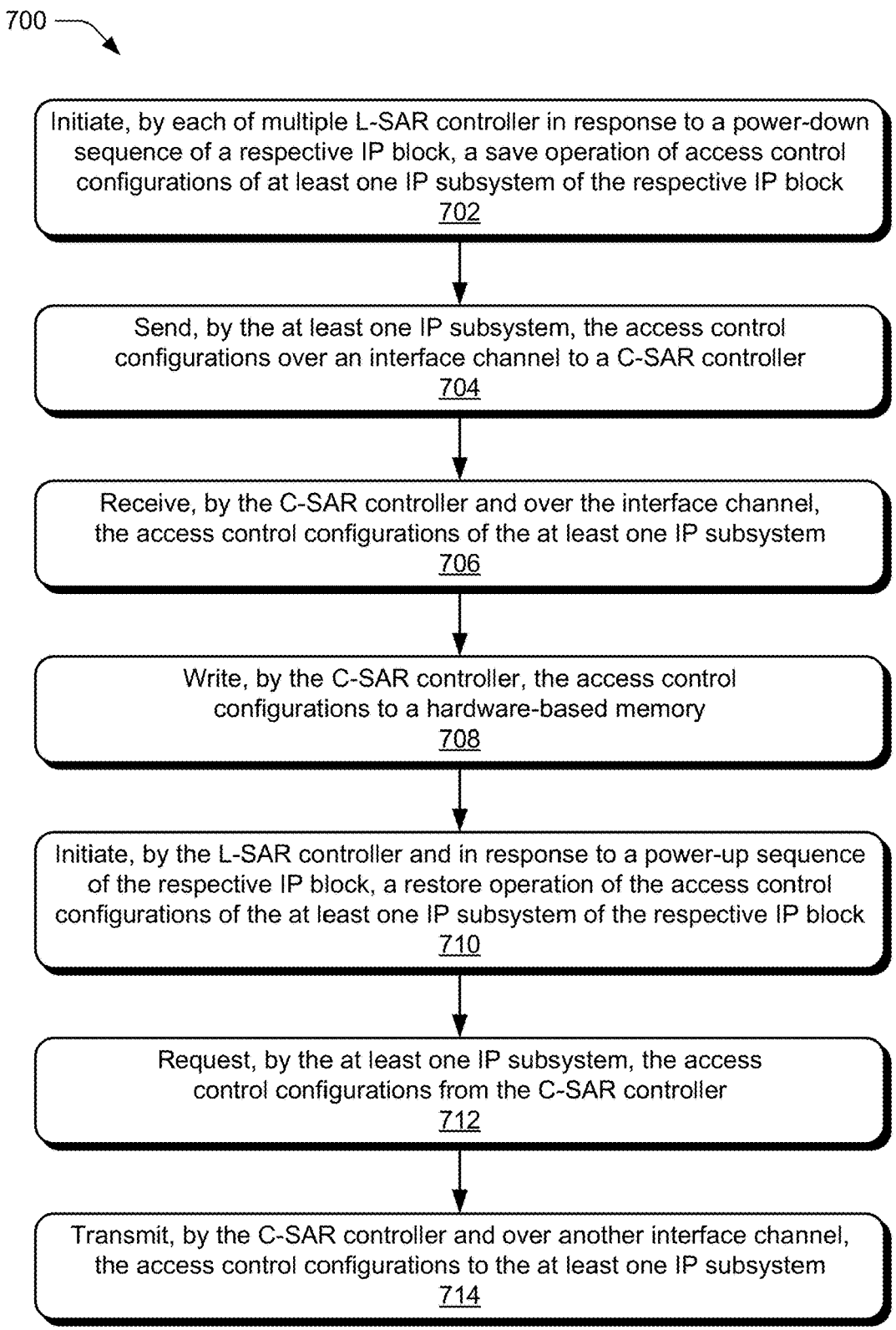
FIG. 7 illustrates example operations of a hardware-based save-and-restore controller of an SoC.

FIG. 7 is a flowchart illustrating example operations 700 of a hardware-based save-and-restore of an SoC 202. The operations 700 are described in the context of the SoC 202 of FIG. 2. The operations 700 may be performed in a different order or with additional or fewer operations.

At 702, each of multiple L-SAR controllers initiates, in response to a power-down sequence of a respective IP block of multiple IP blocks, a save operation of access control configurations of at least one IP subsystem of the respective IP block. The multiple L-SAR controllers are associated with respective ones of the multiple IP blocks. Each of the multiple L-SAR controllers is operatively coupled to the at least one IP subsystem of the respective IP block. The save operation comprises instructions for the at least one IP subsystem to send the access control configurations over an interface channel. For example, in response to a power-down sequence of the respective IP blocks 108, the L-SAR controllers 110 initiate a save operation of access control configurations of the at least one IP subsystem 112 of the respective IP blocks 108. The access control configurations can include any content (e.g., configuration values, internal states, register states) to be preserved across power-down and power-up sequences. As an example, in response to a power-down sequence of a power rail, software in the SoC 202 includes operations to trigger the save operation for each of the L-SAR controllers 110 associated with that power rail. The L-SAR controllers 110 are associated with respective ones of the IP blocks 108. Each of the L-SAR controllers 110 is operatively coupled to the IP subsystems 112 of the respective IP block 108. The save operation comprises instructions for the at least one IP subsystem 112 to send the access control configurations over the interface channel 310.

At 704, the at least one IP subsystem sends the access control configurations over the interface channel to a C-SAR controller. The C-SAR controller includes a hardware-based memory and is operatively coupled, via an interface, to the respective L-SAR controllers of the multiple IP blocks. For example, the IP subsystems 112 send the access control configurations over the interface channel 310 to the C-SAR controller 114. The C-SAR controller 114 includes the SRAM 304 and is operatively coupled, via the interface 302 (e.g., the AXI4 stream interface 502), to the respective L-SAR controllers 110 of the multiple IP blocks 112.

At 706, the C-SAR controller receives, over the interface channel, the access control configurations of the at least one IP subsystem. For example, the C-SAR controller 114 receives, over the interface channel 314, the access control configurations of the IP subsystems 112.

At 708, the C-SAR controller writes the access control configurations to the hardware-based memory. For example, the C-SAR controller 114 writes the access control configurations to the SRAM 304.

At 710, each of the multiple L-SAR controllers initiates, in response to a power-up sequence of the respective IP block, a restore operation of the access control configurations of the at least one IP subsystem of the respective IP block. The restore operation comprises instructions for the at least one IP subsystem to request the access control configurations from the C-SAR controller. For example, in response to a power-up sequence of the respective IP block 108, each of the L-SAR controllers 110 initiates a restore operation of the access control configurations of the IP subsystems 112 of the respective IP block 108. As an example, in response to a power-up sequence of a power rail, software in the SoC 202 includes operations to automatically trigger the restore operation for each of the L-SAR controllers 110 associated with that power rail. The software in the SoC 202 can include a sequence to check if the restore operation has completed successfully. The restore operation comprises instructions for the IP subsystems 112 to request the access control configurations from the C-SAR controller 114.

At 712, the at least one IP subsystem requests the access control configurations from the C-SAR controller. For example, the IP subsystems 112 request the access control configurations from the C-SAR controller 114.

At 714, the C-SAR controller transmits, over another interface channel, the access control configurations to the at least one IP subsystem. For example, the C-SAR controller 114 transmits, over interface channel 316, the access control configurations to the IP subsystems 112.

Figure 8:
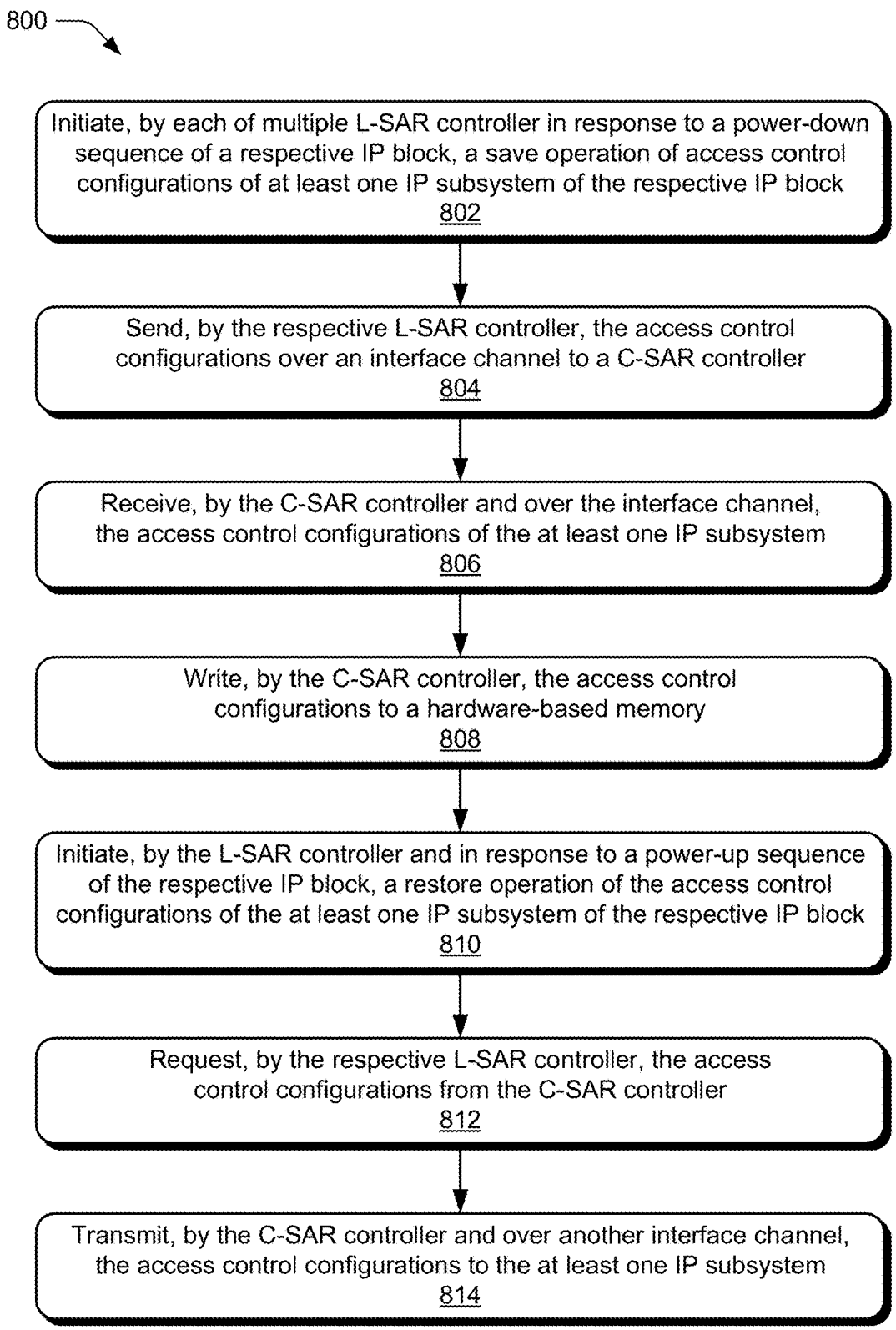
FIG. 8 illustrates other example operations of a hardware-based save-and-restore controller of an SoC.

FIG. 8 is a flowchart illustrating other example operations 800 of a hardware-based save-and-restore of an SoC 202. The operations 800 are described in the context of the SoC 202 of FIG. 2 and the save-and-restore controller of FIG. 4. The operations 800 may be performed in a different order or with additional or fewer operations.

At 802, each of multiple L-SAR controllers initiates, in response to a power-down sequence of a respective IP block of multiple IP blocks, a save operation of access control configurations of at least one IP subsystem of the respective IP block. The multiple L-SAR controllers are associated with respective ones of the multiple IP blocks. Each of the multiple L-SAR controllers is operatively coupled to the at least one IP subsystem of the respective IP block. The save operation comprises instructions for the at least one IP subsystem to send the access control configurations, via the respective L-SAR controller, over an interface channel. For example, in response to a power-down sequence of the respective IP blocks 108, the L-SAR controllers 110 initiate a save operation of access control configurations of the at least one IP subsystem 112 of the respective IP blocks 108. The L-SAR controllers 110 are associated with respective ones of the IP blocks 108. Each of the L-SAR controllers 110 is operatively coupled to the IP subsystems 112 of the respective IP block 108. The save operation comprises instructions for the at least one IP subsystem 112 to send, via the L-SAR controllers 110, the access control configurations over the interface channel 406.

At 804, the respective L-SAR controller sends the access control configurations of at least one IP subsystem over the interface channel to a C-SAR controller. The C-SAR controller includes a hardware-based memory and is operatively coupled, via an interface, to the respective L-SAR controllers of the multiple IP blocks. For example, the respective L-SAR controller 110 sends the access control configurations of the IP subsystems 112 over the interface channel 406 to the C-SAR controller 114. The C-SAR controller 114 includes the SRAM 304 and is operatively coupled, via the interface 302 (e.g., the AXI4 stream interface 502), to the respective L-SAR controllers 110 of the multiple IP blocks 112.

At 806, the C-SAR controller receives, over the interface channel, the access control configurations of the at least one IP subsystem. For example, the C-SAR controller 114 receives, over the interface channel 314, the access control configurations of the IP subsystems 112.

At 808, the C-SAR controller writes the access control configurations to the hardware-based memory. For example, the C-SAR controller 114 writes the access control configurations to the SRAM 304.

At 810, each of the multiple L-SAR controllers initiates, in response to a power-up sequence of the respective IP block, a restore operation of the access control configurations of the at least one IP subsystem of the respective IP block. The restore operation comprises instructions for the at least one IP subsystem to request, via the respective L-SAR controller, the access control configurations from the C-SAR controller. For example, each of the L-SAR controllers 110 initiates, in response to a power-up sequence of the respective IP block 108, a restore operation of the access control configurations of the IP subsystems 112 of the respective IP block 108. The restore operation comprises instructions for the IP subsystems 112 to request, via the respective L-SAR controller 110, the access control configurations from the C-SAR controller 114.

At 812, the respective L-SAR controller 110 requests the access control configurations of the at least one IP subsystem from the C-SAR controller. For example, the respective L-SAR controller 110 requests the access control configurations of the IP subsystems 112 from the C-SAR controller 114.

At 814, the C-SAR controller transmits, over another interface channel, the access control configurations to the at least one IP subsystem via the respective L-SAR controllers. For example, the C-SAR controller 114 transmits, over interface channel 316, the access control configurations to the IP subsystems 112 via the respective L-SAR controllers 110.

EXAMPLES

In the following section, examples are provided.

Example 1: A system-on-chip (SoC) (202) (or other integrated circuit) comprising: multiple intellectual property (IP) blocks (108) including at least one IP subsystem (112); multiple respective local save-and-restore (L-SAR) controllers (110) associated with respective ones of the multiple IP blocks (112), each of the multiple L-SAR controllers (110) operatively coupled to the at least one IP subsystem (112) of the respective IP block (108) and configured to: initiate, in response to a power-down sequence of the respective IP block (108), a save operation of access control configurations of the at least one IP subsystem (112) of the respective IP block, the save operation comprising instructions for the at least one IP subsystem (112) to send the access control configurations over an interface channel (310); and a central save-and-restore (C-SAR) controller (114) that includes a hardware-based memory (204), the C-SAR controller (114) operatively coupled, via an interface (302), to the at least one IP subsystem (112) of the multiple IP blocks (108), the C-SAR controller (114) configured to: receive, over the interface channel (310), the access control configurations of the at least one IP subsystem (112); and write the access control configurations to the hardware-based memory (204).

Example 2: The SoC of example 1, wherein: each of the multiple L-SAR controllers further configured to initiate, in response to a power-up sequence of the respective IP block, a restore operation of the access control configurations of the at least one IP subsystem of the respective IP block, the restore operation comprising instructions for the at least one IP subsystem to request the access control configurations from the C-SAR controller; and the C-SAR controller further configured to transmit, over another interface channel, the access control configurations to the at least one IP subsystem.

Example 3: The SoC of any preceding example, wherein the L-SAR controller, in response to the power-up sequence for the respective IP block, is further configured to: automatically initiate commands to the at least one IP subsystem to restore the respective access control configurations from the C-SAR controller; and restore the respective access control configurations into registers of the at least one IP subsystem.

Example 4: The SoC of any preceding example, wherein: the at least one IP subsystem is configured to send a restore request to the C-SAR controller to restore the respective access control configurations; and the C-SAR controller is further configured to send a restore response including the respective access control configurations.

Example 5: The SoC of any preceding example, wherein: the access control configurations comprise at least one of register states, internal states, configuration values, or a combination thereof of the at least one IP subsystem; and the C-SAR controller is located in an always-on power domain of the SoC.

Example 6: The SoC of any preceding example, wherein the hardware-based memory of the C-SAR controller comprises a static random-access memory (SRAM).

Example 7: The SoC of any preceding example, wherein the interface comprises dedicated point-to-point interface links between the C-SAR controller and the at least one IP subsystem.

Example 8: The SoC of example 7, wherein the interface comprises an advanced extensible interface 4 (AXI4) stream interface.

Example 9: The SoC of any preceding example, wherein each of the multiple IP blocks is part of a power domain of multiple power domains of the SoC.

Example 10: The SoC of any preceding example, wherein the at least one IP subsystem of the respective IP block is configured to send a write request to the C-SAR controller in response to the save operation.

Example 11: The SoC of example 10, wherein the C-SAR controller is further configured to send a status of the write request to the at least one IP subsystem of the respective IP block.

Example 12: The SoC of any of examples 10 or 11, wherein the C-SAR controller, in response to the write request from the at least one IP subsystem, is further configured to allocate a static slot in the hardware-based memory for each of the at least one IP subsystem.

Example 13: The SoC of example 12, wherein the C-SAR controller is further configured to determine, based on the write request, a location, and a size of the static slot at a time of allocation.

Example 14: The SoC of example 13, wherein the size of the static slot is approximately four bytes larger than the size of a payload of the write request.

Example 15: The SoC of any of examples 13 or 14, wherein the C-SAR controller is further configured to store, in the hardware-based memory, a mapping between an identity of the IP subsystem and information regarding the respective static slot in a slot-mapping table.

Example 16: The SoC of example 15, wherein the C-SAR controller is further configured to: allocate a base address for the slot-mapping table at an end of an address space for the hardware-based memory; and add to the slot-mapping table so that the slot-mapping table grows towards another end of the address space for the hardware-based memory.

Example 17: The SoC of example 16, wherein the C-SAR controller is further configured to: allocate a base address for the static slot at the other end of the address space for the memory; and add to an area for the static slot so that the area for the static slot grows toward the end of the address space for the memory.

Example 18: The SoC of any preceding example, wherein the access control configurations comprise register states, internal states, configuration values of the at least one IP subsystem.

Example 19: A user device comprising: the SoC (or integrated circuit) of any of the preceding examples. The user device may optionally further comprise: one or more radio frequency transceivers; and/or non-transitory computer-readable storage media. The computer-readable storage media may store one or more of device data including an operating system, one or more applications, user data, and multimedia data.

Example 20: The user device of example 19, wherein the user device comprises a mobile phone, a tablet device, a laptop computer, a desktop computer, a computerized watch, a wearable computer, or a voice-assistant system.

Example 21: A method for a save-and-restore controller, the method comprising: initiating, by each of multiple local save-and-restore (L-SAR) controllers in response to a power-down sequence of a respective intellectual property (IP) block of multiple IP blocks, a save operation of access control configurations of at least one IP subsystem of the respective IP block, each of the multiple L-SAR controllers associated with one of the multiple IP blocks and operatively coupled to the at least one IP subsystem of the respective IP block, the save operation comprising instructions for the at least one IP subsystem to send the access control configurations over an interface channel; sending, by the at least one IP subsystem, the access control configurations over the interface channel to a central save-and-restore (C-SAR) controller, the C-SAR controller including a hardware-based memory and operatively coupled, via an interface, to the respective L-SAR controllers of the multiple IP blocks; receiving, by the C-SAR controller over the interface channel, the access control configurations of the at least one IP subsystem; and writing, by the C-SAR controller, the access control configurations to the hardware-based memory.

Example 22: The method of example 21, further comprising: initiating, by each of the multiple L-SAR controllers in response to a power-up sequence of the respective IP block, a restore operation of the access control configurations of the at least one IP subsystem of the respective IP block, the restore operation comprising instructions for the at least one IP subsystem to request the access control configurations from the C-SAR controller; requesting, by the at least one IP subsystem, the access control configurations from the C-SAR controller; and transmitting, by the C-SAR controller and over another interface channel, the access control configurations to the at least one IP subsystem.

Example 23: A method for a save-and-restore controller, the method comprising: initiating, by each of multiple local save-and-restore (L-SAR) controllers in response to a power-up sequence of a respective intellectual property (IP) block of multiple IP blocks, a restore operation of access control configurations of at least one IP subsystem of the respective IP block, each of the multiple L-SAR controllers associated with one of the multiple IP blocks and operatively coupled to the at least one IP subsystem of the respective IP block, the restore operation comprising instructions for the at least one IP subsystem to request the access control configurations over an interface channel; requesting, by the at least one IP subsystem, the access control configurations from a central save-and-restore (C-SAR) controller, the C-SAR controller including a hardware-based memory and operatively coupled, via an interface, to the respective L-SAR controllers of the multiple IP blocks; receiving, by the C-SAR controller over the interface channel, the request for the access control configurations of the at least one IP subsystem; and transmitting, by the C-SAR controller and over another interface channel, access control configurations from the hardware-based memory to the at least one IP subsystem. Other aspects of this example provide a corresponding system-on-chip (SoC) (or other integrated circuit.

Example 24: A computer-readable storage medium containing instructions that, when executed by one or more processors, cause the one or more processors to perform the method of any of examples 21-23. The computer-readable storage medium of this example may be a transitory or a non-transitory computer-readable storage medium.

Conclusion

While various configurations and methods for a hardware-based save-and-restore controller in an SoC have been described in language specific to features and/or methods, it is to be understood that the subject of the appended claims is not necessarily limited to the specific features or methods described. Rather, the specific features and methods are disclosed as non-limiting examples of a hardware-based save-and-restore controller in an SoC. Further, although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples.

What is claimed is:

1. A system-on-chip (SoC) comprising:
multiple intellectual property (IP) blocks including at least one IP subsystem;
multiple respective local save-and-restore (L-SAR) controllers associated with respective ones of the multiple IP blocks, each of the multiple L-SAR controllers operatively coupled to the at least one IP subsystem of the respective IP block and configured to:
initiate, in response to a power-down sequence of the respective IP block, a save operation of access control configurations of the at least one IP subsystem of the respective IP block, the save operation comprising instructions for the at least one IP subsystem to send the access control configurations over an interface channel, the at least one IP subsystem of the respective IP block being configured to send a write request in response to the save operation; and
a central save-and-restore (C-SAR) controller that includes a hardware-based memory, the C-SAR controller operatively coupled, via an interface, to the at least one IP subsystem of the multiple IP blocks, the C-SAR controller configured to:
receive, over the interface channel, the access control configurations of the at least one IP subsystem; and
write the access control configurations to the hardware-based memory.

2. The SoC as recited in claim 1, wherein:
each of the multiple L-SAR controllers further configured to initiate, in response to a power-up sequence of the respective IP block, a restore operation of the access control configurations of the at least one IP subsystem of the respective IP block, the restore operation comprising instructions for the at least one IP subsystem to request the access control configurations from the C-SAR controller; and
the C-SAR controller further configured to transmit, over another interface channel, the access control configurations to the at least one IP subsystem.

3. The SoC as recited in claim 2, wherein the L-SAR controller, in response to the power-up sequence for the respective IP block, is further configured to:
automatically initiate commands to the at least one IP subsystem to restore the respective access control configurations from the C-SAR controller; and
restore the respective access control configurations into registers of the at least one IP subsystem.

4. The SoC as recited in claim 1, wherein:
the access control configurations comprise at least one of register states, internal states, configuration values, or a combination thereof of the at least one IP subsystem; and
the C-SAR controller is located in an always-on power domain of the SoC.

5. The SoC as recited in claim 1, wherein the hardware-based memory of the C-SAR controller comprises a static random-access memory (SRAM).

6. The SoC as recited in claim 1, wherein the interface comprises dedicated point-to-point interface links between the C-SAR controller and the at least one IP subsystem.

7. The SoC as recited in claim 6, wherein the interface comprises an advanced extensible interface 4 (AXI4) stream interface.

8. The SoC as recited in claim 1, wherein each of the multiple IP blocks is part of a power domain of multiple power domains of the SoC.

9. The SoC as recited in claim 1, wherein the C-SAR controller is further configured to send a status of the write request to the at least one IP subsystem of the respective IP block.

10. The SoC as recited in claim 1, wherein the C-SAR controller, in response to the write request from the at least one IP subsystem, is further configured to allocate a static slot in the hardware-based memory for each of the at least one IP subsystem.

11. The SoC as recited in claim 1, wherein the SoC is embodied in a user device comprising one or more radio frequency transceivers and non-transitory computer-readable storage media that are operably coupled with the SoC.

12. The SoC as recited in claim 11, wherein the user device comprises a mobile phone, a tablet device, a laptop computer, a desktop computer, a computerized watch, a wearable computer, or a voice-assistant system.

13. A system-on-chip (SoC) comprising:
multiple intellectual property (IP) blocks including at least one IP subsystem;
multiple respective local save-and-restore (L-SAR) controllers associated with respective ones of the multiple IP blocks, each of the multiple L-SAR controllers operatively coupled to the at least one IP subsystem of the respective IP block and configured to:
initiate, in response to a power-up sequence of the respective IP block, a restore operation of access control configurations of the at least one IP subsystem of the respective IP block, the restore operation comprising instructions for the at least one IP subsystem to request the access control configurations from a central save-and-restore (C-SAR) controller, the at least one IP subsystem configured to send a restore request to restore respective access control configurations; and the C-SAR controller including a hardware-based memory, the C-SAR controller operatively coupled, via an interface, to the at least one IP subsystem of the multiple IP blocks, the C-SAR controller configured to:
receive, over an interface channel, the access control configurations of the at least one IP subsystem;
receive, from the at least one IP subsystem over the interface channel, the restore request to restore the respective access control configurations; and
send a restore response including the respective access control configurations to the at least one IP subsystem.

14. The SoC as recited in claim 13, wherein each of the L-SAR controllers, in response to the power-up sequence for the respective IP block, is further configured to:
automatically initiate commands to the at least one IP subsystem to restore the respective access control configurations from the C-SAR controller; and
restore the respective access control configurations into registers of the at least one IP subsystem.

15. The SoC as recited in claim 13, wherein:
each of the multiple L-SAR controllers are configured to initiate, in response to a power-down sequence of the respective IP block, a save operation of access control configurations of the at least one IP subsystem of the respective IP block, the save operation comprising instructions for the at least one IP subsystem to send the access control configurations over an interface channel; and
the C-SAR controller is configured to:
receive, over the interface channel, the access control configurations of the at least one IP subsystem; and
write the access control configurations to the hardware-based memory.

16. A method for a save-and-restore controller, the method comprising:
initiating, by each of multiple local save-and-restore (L-SAR) controllers of an integrated circuit in response to a power-down sequence of a respective intellectual property (IP) block of multiple IP blocks of the integrated circuit, a save operation of access control configurations of at least one IP subsystem of the respective IP block, each of the multiple L-SAR controllers associated with one of the multiple IP blocks and operatively coupled to the at least one IP subsystem of the respective IP block, the save operation comprising instructions for the at least one IP subsystem to send the access control configurations over an interface channel;
sending, by the at least one IP subsystem of the respective IP block, a write request to a central save-and-restore (C-SAR) controller in response to the save operation;
sending, by the at least one IP subsystem, the access control configurations over the interface channel to the C-SAR controller of the integrated circuit, the C-SAR controller including a hardware-based memory and operatively coupled, via an interface, to respective L-SAR controllers of the multiple IP blocks;
receiving, by the C-SAR controller over the interface channel, the write request and the access control configurations of the at least one IP subsystem; and
writing, by the C-SAR controller, the access control configurations to the hardware-based memory.

17. The method as recited in claim 16, further comprising:
initiating, by each of the multiple L-SAR controllers of the integrated circuit in response to a power-up sequence of the respective IP block, a restore operation of the access control configurations of the at least one IP subsystem of the respective IP block, the restore operation comprising instructions for the at least one IP subsystem to request the access control configurations from the C-SAR controller of the integrated circuit;
requesting, by the at least one IP subsystem, the access control configurations from the C-SAR controller; and
transmitting, by the C-SAR controller and over another interface channel, the access control configurations to the at least one IP subsystem.

18. The method as recited in claim 16, further comprising:
in response to a power-up sequence for the respective IP block, automatically initiating, by a respective L-SAR controller, commands to the at least one IP subsystem to restore the respective access control configurations from the C-SAR controller; and
restoring, by the respective L-SAR controller, the respective access control configurations into registers of the at least one IP subsystem.

19. The method as recited in claim 16, further comprising sending, by the C-SAR controller, a status of the write request to the at least one IP subsystem of the respective IP block.

20. The method as recited in claim 16, further comprising:
in response to the write request from the at least one IP subsystem, allocating, by the C-SAR controller, a static slot in the hardware-based memory for each of the at least one IP subsystem.

* * * * *